(12) United States Patent
Cunningham et al.

(10) Patent No.: US 8,087,397 B2
(45) Date of Patent: Jan. 3, 2012

(54) METHOD AND SYSTEM FOR CONTROLLING VACUUM

(75) Inventors: Ralph Wayne Cunningham, Milan, MI (US); Amey Y. Karnik, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/899,370

(22) Filed: Oct. 6, 2010

(65) Prior Publication Data

US 2011/0174266 A1 Jul. 21, 2011

(51) Int. Cl.
*F02D 9/08* (2006.01)
*F02D 9/00* (2006.01)
(52) U.S. Cl. .......................... 123/403; 123/389
(58) Field of Classification Search .............. 123/403, 123/361, 339.28, 360, 389; 60/397, 411, 60/418; 303/12; 188/356
See application file for complete search history.

(56) References Cited

U.S. PATENT DOCUMENTS

| | | | | |
|---|---|---|---|---|
| 2,721,629 | A * | 10/1955 | Saussard | 188/356 |
| 3,031,884 | A * | 5/1962 | Martin | 73/40 |
| 3,408,118 | A * | 10/1968 | Tadao Asano et al. | 303/22.1 |
| 4,213,437 | A * | 7/1980 | Onofrio | 123/179.18 |
| 5,197,433 | A * | 3/1993 | Dykstra et al. | 123/184.55 |
| 6,557,524 | B2 * | 5/2003 | Tsunooka | 123/399 |
| 6,735,942 | B2 | 5/2004 | Wild et al. | |
| 6,763,803 | B2 | 7/2004 | Wild et al. | |
| 7,475,951 | B2 | 1/2009 | Ichikawa | |
| 2003/0006891 | A1 | 1/2003 | Wild et al. | |

* cited by examiner

*Primary Examiner* — Mahmoud Gimie
(74) *Attorney, Agent, or Firm* — Allan J. Lippa; Alleman Hall McCoy Russell & Tuttle LLP (57) ABSTRACT

An engine with a two vacuum sources is disclosed. In one example, a valve position is adjusted in when engine load is low and intake manifold pressure is low to arbitrate vacuum between the two vacuum sources. The approach may increase engine operating efficiency during at least some conditions.

19 Claims, 4 Drawing Sheets

METHOD AND SYSTEM FOR CONTROLLING VACUUM

BACKGROUND/SUMMARY

Vacuum may be used to operate or to assist in the operation of various devices of a vehicle. For example, vacuum may be used to assist a driver applying vehicle brakes. Further, vacuum may be used to adjust the position of a turbocharger waste gate or a turbocharger vane position. Vacuum is often obtained from an engine intake manifold in normally aspirated engines because the intake manifold pressure is often at a pressure lower than atmospheric pressure. However, in boosted engines where intake manifold pressures are often at pressures greater than atmospheric pressure, intake manifold vacuum may replaced or augmented with vacuum from a pump. In systems that rely on intake manifold vacuum and/or pump vacuum, pressure controlled check valves may be used to control vacuum of a reservoir that assists actuator operation. For example, if engine intake manifold pressure is low, air may be drawn from a vacuum reservoir to the engine intake manifold via a pressure controlled check valve. However, if engine intake manifold pressure is high, the pressure controlled check valve may limit air flow from the intake manifold to the vacuum reservoir. In this way, vacuum that assists actuator operation of a vehicle system may be controlled.

Pressure controlled check valves have known operating characteristics and are inexpensive. However, pressure controlled check valves may open or close during engine operating conditions when it may not be desirable to do so. For example, if an engine is operating at a low load condition and an opening area of the air intake passage throttle is small, vacuum in the engine air intake manifold may cause a pressure controlled valve to open such that air flow to the engine increases beyond a desired amount. As a result, engine spark may be retarded so that the desired engine torque is provided. However, increasing the engine spark retard can decrease engine efficiency and increase engine fuel consumption.

The inventors herein have recognized the above-mentioned disadvantages and have developed an engine operating method, comprising: operating an engine at a condition where a intake throttle is substantially closed; and closing a valve to limit engine air flow from a vacuum reservoir to the engine intake manifold when a pressure in the engine intake manifold is less than a pressure in the vacuum reservoir.

By closing a valve between a vehicle vacuum reservoir and an engine intake manifold, it may be possible to reduce fuel consumption and provide system vacuum. In particular, a valve between an engine intake manifold and a vacuum reservoir may be closed to limit air flow to the engine. Thus, fuel may be conserved because additional fuel may not have to be delivered to the engine to keep engine exhaust gases substantially stoichiometric. Further, a vacuum pump can provide vacuum to vehicle systems while the intake manifold is isolated from the vacuum reservoir via the valve. In this way, it is possible to reduce engine fuel consumption and provide vacuum to a vehicle system vacuum reservoir.

The present description may provide several advantages. For example, the approach may improve engine fuel economy. Further, the approach can provide additional system flexibility. Further still, the approach may provide improved vacuum control during some conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
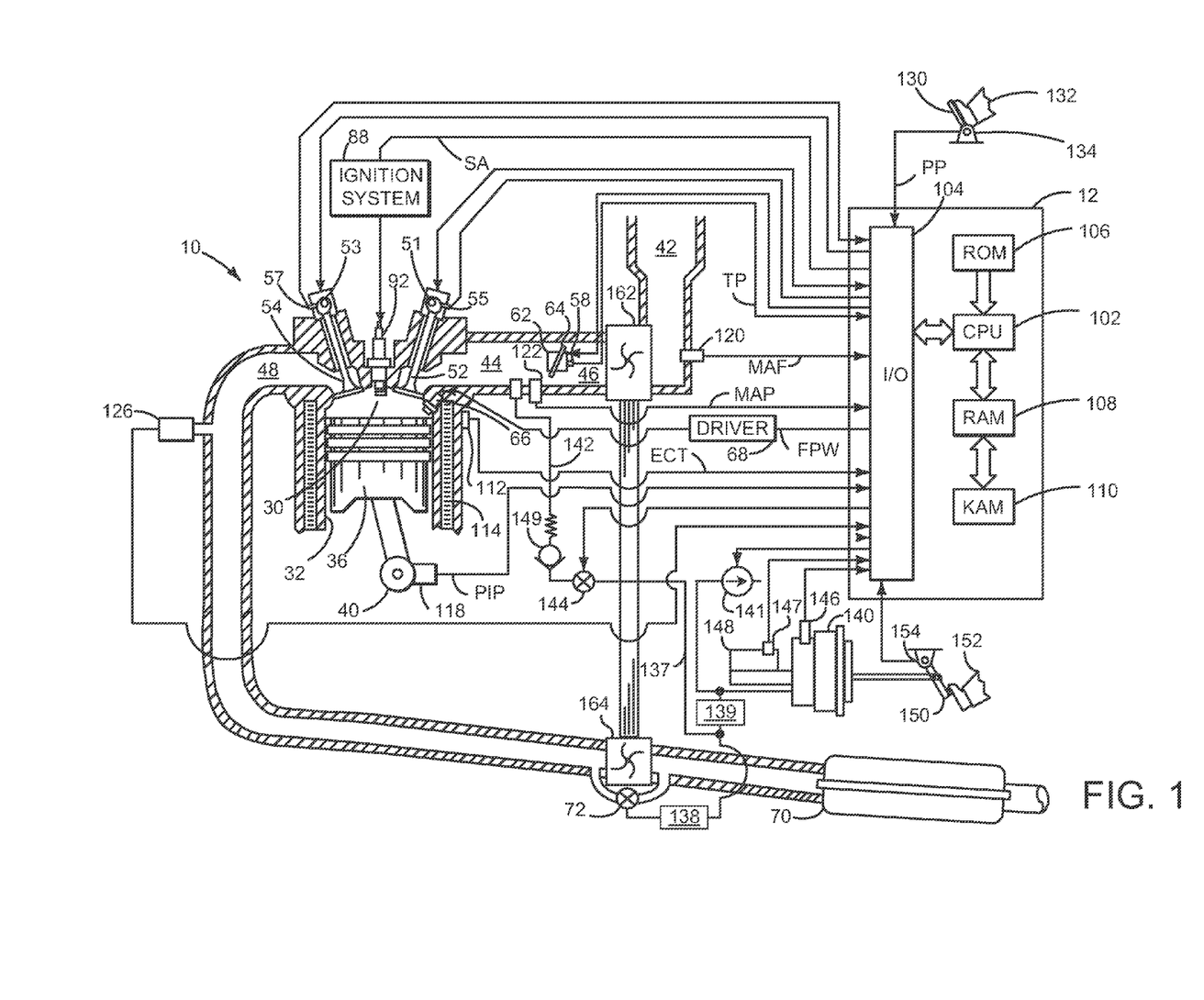
FIG. 1 shows a schematic depiction of an engine.
Figure 2:
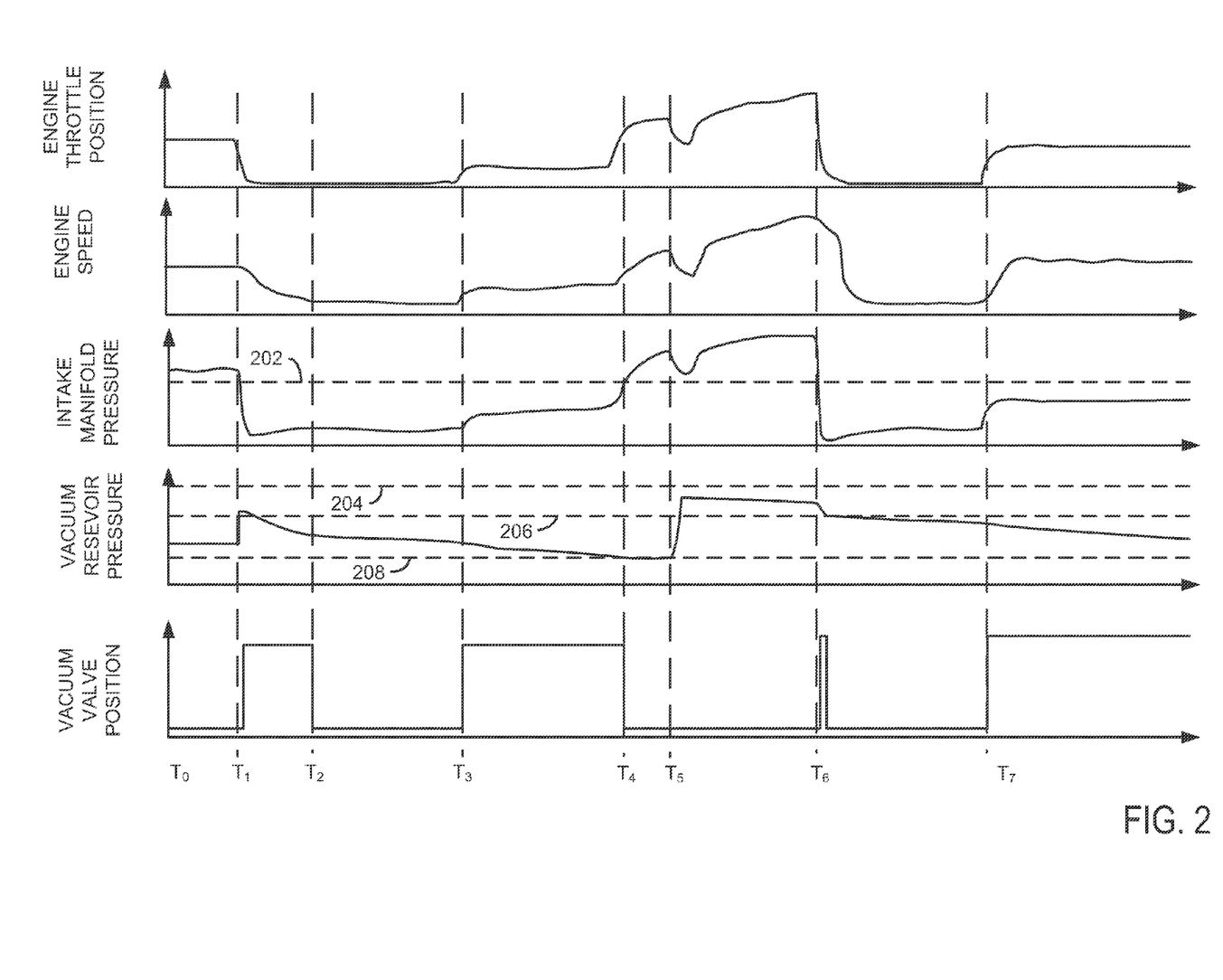
FIG. 2 shows simulated signals of interest during engine operation.

The present description is related to controlling vacuum used to assists in actuator operation. FIG. 1 shows one example embodiment for controlling vacuum used to assist actuator operation. FIG. 2 shows simulated signals of interest when controlling vacuum within a reservoir that supplies power to assist in actuator operation according to the methods of FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162. Vacuum operated waste gate actuator 72 allows exhaust gases to bypass turbine 164 so that boost pressure can be controlled under varying operating conditions. Vacuum is supplied to waste gate actuator 72 via vacuum reservoir 138, conduit 137, vacuum control valve 144, check valve 149, and intake manifold 44. Intake manifold 44 also provides vacuum to brake booster 140 via conduit 142. Check valve 149 limits air flows from brake booster 140 to intake manifold 44 and not substantially limit air flow from intake manifold 44 to brake booster 140. Brake booster 140 includes a vacuum reservoir and it amplifies force provided by foot 152 via brake pedal 150 to master cylinder 148 for applying vehicle brakes (not shown). Vacuum control valve 144 is opened and closed via an electric signal from controller 12. Brake booster 140 may be supplied vacuum via pump 141 or intake manifold 44 via restrictor 139, vacuum control valve 144, and check valve 149.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, simulated signals of interest during engine operation are shown. Vertical markers $T_0$-$T_7$ identify particular times of interest during the operating sequence.

The first plot from the top of FIG. 2 shows engine throttle position versus time. Time starts at the left side of the plot and increases to the right. Engine throttle position is at its lowest value at the bottom of the plot and increases in magnitude toward the top of the plot. A lower throttle position provides a smaller throttle opening amount. A higher throttle position provides a larger throttle opening amount.

The second plot from the top of FIG. 2 shows engine speed versus time. Time starts at the left side of the plot and increases to the right. Engine speed is at its lowest value at the bottom of the plot and increases toward the top of the plot.

The third plot from the top of FIG. 2 shows engine intake manifold pressure versus time. Time starts at the left side of the plot and increases to the right. Engine intake manifold pressure increases in the direction of the Y-axis arrow. Horizontal marker 202 represents atmospheric pressure in the second plot. Thus, when manifold pressure is above marker 202 the intake manifold is at a positive pressure. When manifold pressure is below marker 202 the intake manifold is at a vacuum.

The fourth plot from the top of FIG. 2 shows vacuum reservoir pressure versus time. Time starts at the left side of the plot and increases to the right. Horizontal marker 204 represents atmospheric pressure in the fourth plot. Horizontal marker 206 represents a second threshold level of vacuum reservoir pressure. Horizontal marker 208 represents a first threshold level of vacuum reservoir pressure. Vacuum reservoir vacuum is at a higher level of vacuum at the bottom of the plot.

The fifth plot from the top of FIG. 2 shows a vacuum control valve command (e.g. valve 144 of FIG. 1). Time starts at the left side of the plot and increases to the right. The vacuum control valve is open when the signal is near the top of the plot, and the vacuum control valve is closed when the signal is near the bottom of the plot.

It should be noted that intake manifold pressure and vacuum reservoir pressure are not plotted to the same scale. For example, the units of the Y axis of the intake manifold pressure plot are not equivalent to the units of the Y axis of the vacuum reservoir plot.

At time $T_0$, the engine is operating at a medium engine throttle position (e.g., 35% of wide-open-throttle (WOT)). Further, the engine speed is at a medium engine speed (e.g., 2500 RPM), the intake manifold pressure is above atmospheric pressure, pressure in the vacuum reservoir is between a first threshold pressure 208 and a second threshold pressure 206, and the vacuum control valve is in a closed state. In addition, a vacuum pump draws air from the vacuum reservoir while pressure in the vacuum reservoir is above a first pressure threshold 208.

At time $T_1$, the throttle position is reduced thereby decreasing the intake throttle opening area. Further, engine speed starts to decrease and engine intake manifold pressure also decreases. Pressure in the vacuum reservoir (e.g., brake booster reservoir or waste gate reservoir; see FIG. 1 140 and 138) also increases at $T_1$. The pressure increase indicates that air is flowing into the vacuum reservoir. In this example, the vacuum reservoir pressure increase is related to applying vehicle brakes. The vacuum control valve is opened near $T_1$ as the intake manifold pressure falls below atmospheric pressure. Opening the vacuum control valve allows air to flow from the vacuum reservoir to the engine intake manifold when engine intake manifold pressure is less than vacuum reservoir pressure. As a result, the vacuum reservoir pressure begins to be reduced shortly after time $T_1$. Vacuum reservoir pressure continues to decrease in response to the engine intake manifold drawing air from the vacuum reservoir.

At time $T_2$, the vacuum control valve is closed. The vacuum control valve is closed in response to the throttle opening being less than a threshold amount and the measured or estimated engine air amount being greater than the desired engine air amount. The engine air amount is further reduced when the vacuum control valve is closed, thereby moving the measured or estimated engine air amount toward the desired engine air amount. Reducing the measured engine air amount allows less fuel to be injected to the engine to support stoichiometric combustion. Thus, less fuel may be consumed when the engine air amount is reduced. It should also be mentioned that the engine intake throttle is substantially closed for a substantial amount of time between $T_1$ and $T_3$. In some examples an engine intake throttle is substantially closed when a plate of the throttle is positioned against a closing stopper. In other examples, an engine intake throttle is substantially closed when the throttle opening area is less than a predetermined amount, less than 3% of WOT for example.

Between time $T_2$ and $T_3$ the vacuum reservoir pressure continues to decrease, but at a lower rate. The vacuum reservoir pressure continues to decrease in response to air being drawn from the vacuum reservoir via a vacuum pump. The vacuum pump may be mechanically or electrically driven.

At time $T_3$, the throttle begins to open while engine speed and engine intake manifold pressure increase. The throttle is adjusted and engine load is at a level that does not require a positive intake manifold pressure to meet the desired level of engine torque. Therefore, the intake manifold pressure increases but remains below atmospheric pressure. Further, the intake manifold pressure is below the vacuum reservoir pressure so the vacuum control valve is opened to allow air flow from the vacuum reservoir to the engine intake manifold. Further still, the vacuum control valve is opened because the throttle opening is greater than a threshold amount and because the desired engine air amount can be provided while the vacuum control valve is open. Thus, the desired engine air amount is greater than the air flow from the vacuum control valve to the engine intake manifold. Opening the vacuum control valve allows air to pass from the vacuum reservoir to the engine intake manifold, thereby reducing the vacuum reservoir pressure.

At time $T_4$, the vacuum control valve is closed since the intake manifold pressure is higher than the vacuum reservoir pressure. The intake manifold pressure increases in response to an increase in engine torque request. In addition, the pressure in the vacuum reservoir is reduced to less than the first threshold pressure 208. As a result, the vacuum pump is turned off at $T_4$ in response to vacuum reservoir pressure being less than the first threshold pressure 208.

At time $T_5$, the desired torque begins to fall as indicated by the reduction in throttle position. Further, the intake manifold pressure begins to fall but remains above atmospheric pressure and vacuum reservoir pressure. The vacuum reservoir pressure also increases at $T_5$ in response to application of a vehicle brake. The increase in vacuum reservoir pressure causes a controller to restart the vacuum pump.

Between time $T_5$ and time $T_6$, engine speed and throttle position briefly decrease and then increase as time approaches $T_6$. The vacuum control valve remains in a closed position between $T_5$ and $T_6$ since intake manifold pressure is greater than vacuum reservoir pressure. In some system configurations where a check valve is placed in line with the vacuum control valve, the vacuum control valve may remain open since the check valve can limit air flow from the vacuum reservoir to the engine intake manifold.

At time $T_6$, the throttle opening area is reduced in response to a reduction in the desired engine torque. The engine speed is at a higher level at time $T_6$ when the throttle opening area is reduced. Consequently, the engine intake manifold pressure is reduced to a lower level shortly after time $T_6$. The vacuum control valve is opened briefly as intake manifold pressure falls below vacuum reservoir pressure; however, the vacuum control valve closes shortly after opening in response to the lower intake manifold pressure. The vacuum control valve is closed so that pressure in the vacuum reservoir does not go lower than is desired. In one example, the desired vacuum reservoir pressure may always be above a predetermined level. In particular, the predetermined level may be a pressure level that is related to operation of the brake booster or another actuator. The vacuum reservoir pressure decreases in response to opening the vacuum control valve and vacuum reservoir pressure continues to decrease after the vacuum control valve is closed since the vacuum pump draws air from the vacuum reservoir.

Between $T_6$ and $T_7$, the desired engine air amount is less than the amount of air that would be provided if the vacuum control valve were commanded to an open position until just before time $T_7$ when throttle opening area is increased in response to an increase in desired engine torque. Therefore, the vacuum control valve remains closed until time $T_7$. While the vacuum control valve is closed, the vacuum pump continues to operate and vacuum reservoir pressure is decreased.

At time $T_7$, the engine air amount is increased and the intake manifold pressure is less than the vacuum reservoir pressure so the vacuum control valve is opened. Opening the vacuum control valve can cause air flow from the vacuum reservoir to the engine intake manifold. The vacuum control valve remains open for the remainder of time shown in the plots.

Figure 3:
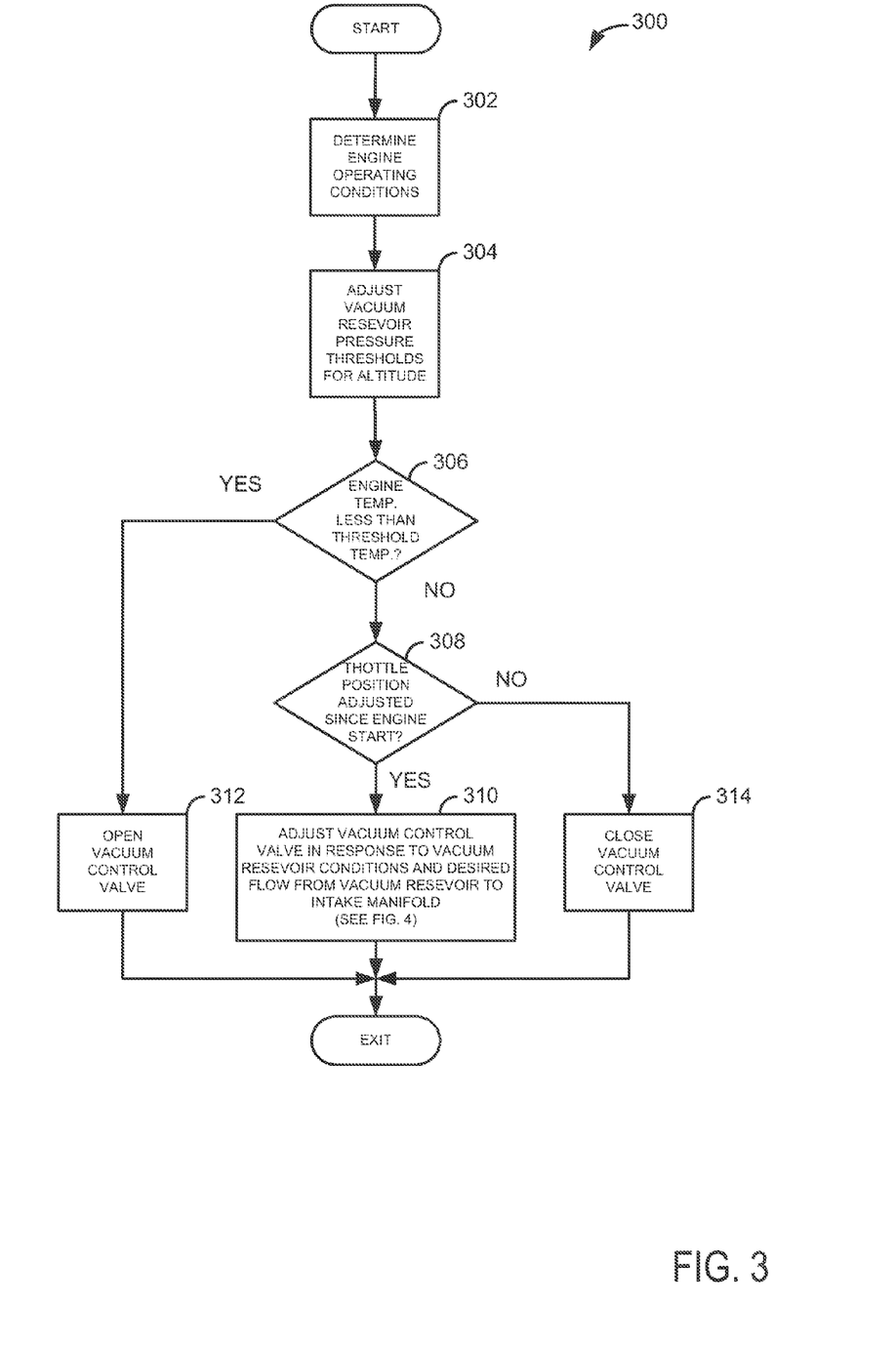
FIG. 3 shows a high level flowchart of a method for adjusting operation of a vacuum control valve.

Referring now to FIG. 3, a high level flowchart for adjusting operation of a vacuum control valve is shown. The method of FIG. 3 is executable by instructions of controller 12 of FIG. 1.

At 302, method 300 determines engine operating conditions. Engine operating conditions include but are not limited to engine speed, engine load, vacuum reservoir pressure, engine intake manifold pressure, intake throttle position, brake actuator position, and desired engine torque. Method 300 proceeds to 304 after engine operating conditions are determined.

At 304, method 300 adjusts vacuum reservoir pressure thresholds for altitude or barometric pressure. When a vehicle operates at altitude where barometric pressure is lower than at sea level, less air is available to operate a naturally aspirated engine. Therefore, the throttle opening area has to be increased at higher altitudes as compared to at sea level to provide a desired engine air amount at idle conditions. Consequently, the pressure difference between atmospheric pressure and intake manifold pressure is reduced at idle. As such, a reduced amount of vacuum may be provided by the engine to evacuate air from the vacuum reservoir. Similarly, a vacuum pump may provide a reduced amount of vacuum as altitude increases.

Method 300 adjusts vacuum reservoir pressure thresholds in response to barometric pressure or altitude. In one example, a first pressure threshold (e.g., see FIG. 2) is increased so that the first pressure threshold is closer to barometric pressure when a vehicle is operated at altitude as compared to when the vehicle is operated at sea level. Similarly, a second pressure threshold is also increased in response to a vehicle operating at a higher altitude than sea level. In one example, the first and second pressure thresholds are adjusted based on a value stored in a table or function. The table or function is indexed by barometric pressure and an adjustment to the pressure threshold is output. Method 300 proceeds to 306 after vacuum reservoir pressure thresholds are adjusted.

At 306, routine 300 judges whether or not engine temperature is less than a threshold engine temperature. In one example, the threshold temperature is used to determine if the engine is at cold start conditions. If engine temperature is less than the threshold temperature, method 300 proceeds to 312. Otherwise, method 300 proceeds to 308.

At 308, method 300 judges whether or not throttle position has been adjusted since engine start after an engine stop. Method 300 proceeds to 310 if throttle position has been adjusted since engine start. Otherwise, method 300 proceeds to 314.

At 310, method 300 adjusts opening and closing of a vacuum control valve. In one example, method 300 adjusts the opening and closing of a vacuum control valve as is shown in FIG. 2 and in accordance with the method of FIG. 4. Method 300 proceeds to exit after adjusting the vacuum control valve.

At 314, method 300 closes the vacuum control valve. The vacuum control valve is closed at 314 when the engine is started at warm operating conditions and before the driver or a controller causes the engine throttle position to be adjusted. Vacuum may be provided to the vacuum reservoir by a vacuum pump when the vacuum control valve is closed. The vacuum control valve is closed during a warm start before a first throttle adjustment since the engine was stopped and the engine restarted so that the throttle has the capability of adjusting engine air amount to a low level without retarding spark. Once the throttle has been adjusted, the method of FIG. 4 may be used to control the vacuum control valve at 310.

At 312, method 300 opens the vacuum control valve. During a cold engine start, the engine air amount may be increased during idle conditions to bring the engine up to operating temperature at an increased rate. Therefore, if the engine intake manifold pressure is less than the vacuum reservoir pressure, air can be drawn to the engine intake manifold via the vacuum control valve. Thus, under some conditions, the intake manifold may increase the vacuum in the vacuum reservoir during a cold start. The engine torque may be controlled by retarding spark which may further increase the amount of energy transferred from the engine to the exhaust gas after treatment system.

Figure 4:
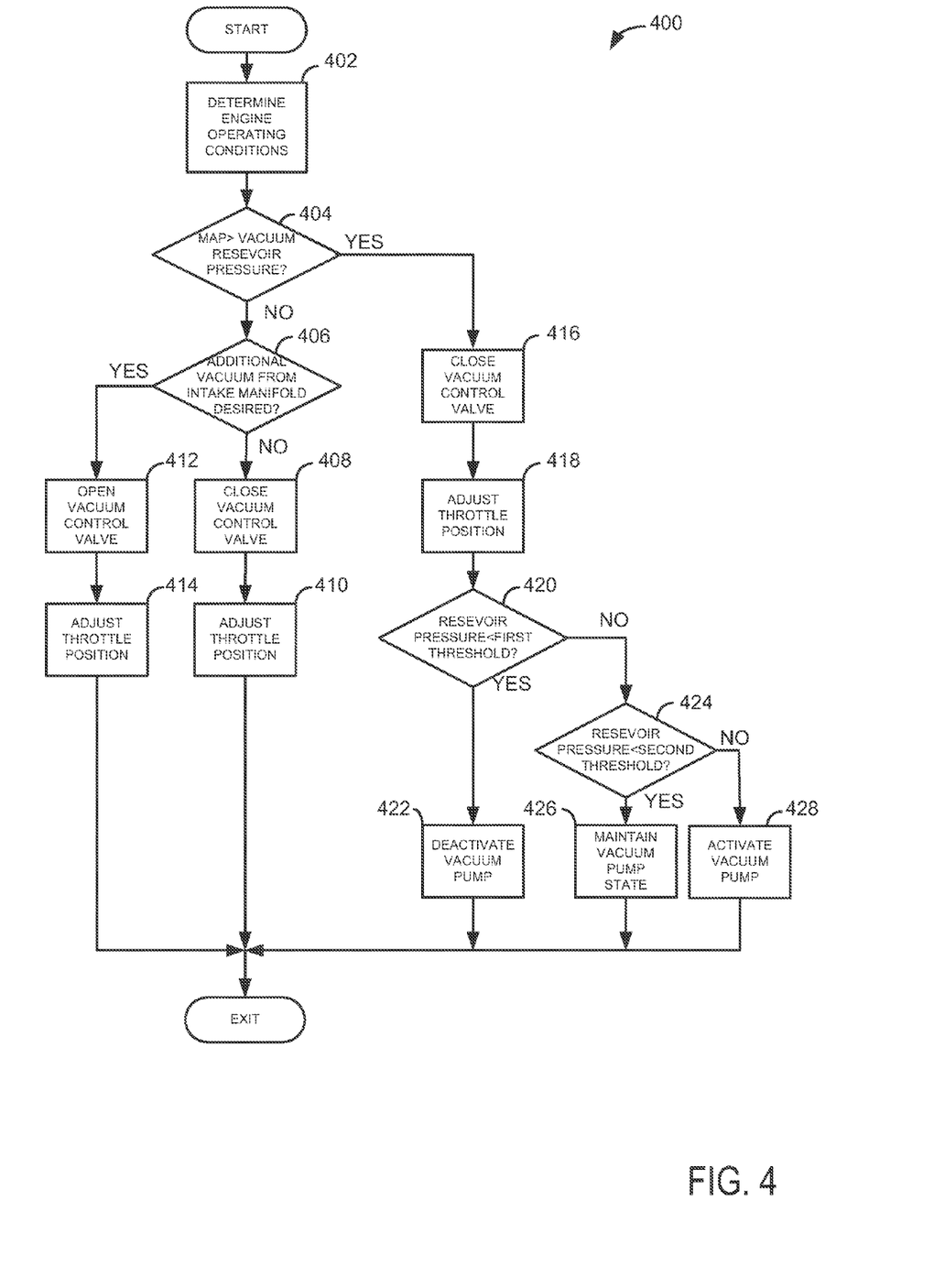
FIG. 4 shows a flowchart of a method for adjusting a vacuum control valve in response to vacuum reservoir conditions and a desired flow rate from the vacuum reservoir to the engine intake manifold.

Referring now to FIG. 4, a flowchart of a method for adjusting a vacuum control valve in response to vacuum reservoir conditions and a desired flow rate from the vacuum reservoir to the engine intake manifold is shown. The method of FIG. 4 is executable by instructions of the controller of FIG. 1.

At 402, method 400 determines engine operating conditions. Engine operating conditions include but are not limited to engine speed, engine load, vacuum reservoir pressure, engine intake manifold pressure, intake throttle position, brake actuator position, and desired engine torque. Method 400 proceeds to 404 after engine operating conditions are determined.

At 404, method 400 judges whether or not manifold absolute pressure (MAP) is greater than vacuum reservoir absolute pressure. If method 400 judges MAP is greater than vacuum reservoir absolute pressure, method 400 proceeds to 416. Otherwise, method 400 proceeds to 406.

At 406, method 400 judges whether or not additional vacuum from the intake manifold is desired. In a first example, additional vacuum in the vacuum reservoir is not desired to be supplied by the engine intake manifold when the engine speed is higher and the intake throttle opening amount is small. For example, additional vacuum supplied by the engine intake manifold is not desired when engine speed is greater than 3500 RPM and the engine throttle opening amount is less than 5% of WOT. In another example, additional vacuum in the vacuum reservoir is not desired to be supplied by the engine intake manifold when the engine speed is low, the throttle opening amount is low, and when the engine air amount is greater than the desired engine air amount. For example, additional vacuum supplied by the engine intake manifold is not desired when engine the engine is at idle (e.g., less than 900 RPM) and the throttle opening amount is less than 3% of WOT. In other examples, it may be judged that air flow from the vacuum reservoir to the engine intake manifold is not desired when the desired engine air amount is less than a predetermined threshold engine air amount. If method 400 judges additional vacuum from the intake manifold is desired during the present engine operating conditions, method 400 proceeds to 412. Otherwise, method 400 proceeds to 408.

At 408, method 400 closes the vacuum control valve. In examples where the vacuum control valve is normally open, the vacuum control valve can be closed by applying an electrical signal to the vacuum control valve. In examples where the vacuum control valve is normally closed, the vacuum control valve can be closed by removing an electrical signal from the vacuum control valve. Method 400 proceeds to 410 after closing the vacuum control valve.

At 410, method 400 compensates for closing the vacuum control valve by compensating for any air flow change into the intake manifold from the vacuum reservoir by increasing the engine throttle opening amount. In one example, the air flow from the vacuum reservoir to the engine intake manifold can be determined by indexing a function that describes flow from the vacuum reservoir to the engine intake manifold based on the pressure difference between the vacuum reservoir and the engine intake manifold. The intake throttle position can be adjusted via a function that outputs throttle position based on a desired throttle flow rate and the pressure differential across the throttle. Thus, the air flow rate from the vacuum reservoir to the engine intake manifold can be added to the desired throttle flow rate to determine the adjusted throttle position.

At 412, method 400 opens the vacuum control valve. In examples where the vacuum control valve is normally open, the vacuum control valve can be opened by removing an electrical signal to the vacuum control valve. In examples where the vacuum control valve is normally closed, the vacuum control valve can be opened by applying an electrical signal to the vacuum control valve. Method 400 proceeds to 414 after opening the vacuum control valve.

At 414, method 400 compensates for opening the vacuum control valve by reducing air flow to the intake manifold from other sources (e.g., throttle, PCV valve, bypass air valve). The air adjustment to the intake throttle position or other air flow control device is effected as described at 410. In addition, the vacuum pump may be activated at 414 if desired.

At 416, method 400 closes the vacuum control valve. The vacuum control valve is closed as described at 408. At 418, air flowing into the engine intake manifold is adjusted by changing the position of an intake throttle or other device as described at 410. Method 400 proceeds to 420 after the vacuum control valve is closed and the engine intake air flow is adjusted.

At 420, method 400 judges whether or not pressure in the vacuum reservoir is less than a first threshold level. If so, method 400 proceeds to 422. Otherwise, method 400 proceeds to 424.

At 422, method 400 deactivates a vacuum pump in systems where a vacuum pump is present. If the vacuum pump is electrically driven, electrical power is removed from the vacuum pump. If the vacuum pump is mechanically driven, a clutch or cam profile may be adjusted to deactivate the vacuum pump. Method 400 proceeds to exit after the vacuum pump is deactivated.

At 424, method 400 judges whether or not vacuum reservoir pressure is less than a second threshold amount (e.g., see FIG. 2 at 206). If method 400 judges vacuum reservoir to be less than the second threshold amount, method 400 proceeds to 426. Otherwise, method 400 proceeds to 432.

At 426, method 400 maintains the vacuum pump in the same operating state. For example, if the vacuum pump is activated at 428, the vacuum pump remains activated and method 400 proceeds to exit. On the other hand, if the vacuum pump is deactivated at 422, the vacuum pump remains deactivated and method 400 proceeds to exit.

At 428, method 400 activates the vacuum pump. In examples where the vacuum pump is electrically driven, a voltage is applied to the vacuum pump. In examples where the vacuum pump is mechanically driven, a clutch or cam device couples the vacuum pump to the mechanical power source. Method 400 proceeds to exit after the vacuum pump is activated.

Thus, when MAP is not greater than vacuum reservoir pressure, the state of the vacuum control valve is determined in response to whether or not additional vacuum from the engine intake manifold is desired under the present engine operating conditions. Further, is should be noted that operations 416-428 may replace 408 and 410 in some examples so that the vacuum pump can be deactivated, activated, or maintained in a present state, depending on first and second vacuum reservoir pressure thresholds when MAP is not greater than vacuum reservoir pressure. When MAP is greater than vacuum reservoir pressure, the vacuum control valve is closed and the state of the vacuum pump is varied in response to vacuum reservoir pressure.

As will be appreciated by one of ordinary skill in the art, the methods described in FIGS. 3-4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
   operating an engine at a condition where an intake throttle is substantially closed;
   closing a valve to limit engine air flow from a vacuum reservoir to an engine intake manifold when a pressure in the engine intake manifold is less than a pressure in the vacuum reservoir; and
   at least partially opening the valve in response to an increase in engine load.

2. The engine operating method of claim 1, where a desired engine air amount is less than an amount of air flowing into an engine intake manifold via the closed intake throttle and the valve.

3. The engine operating method of claim 1, where the vacuum reservoir is a turbocharger waste gate vacuum reservoir or a brake booster.

4. The engine operating method of claim 1, further comprising decreasing the pressure in the vacuum reservoir via a pump when the valve is closed.

5. The engine operating method of claim 1, further comprising increasing an intake throttle opening amount in response to closing the valve.

6. The engine operating method of claim 2, where a position of the substantially closed intake throttle varies with barometric pressure.

7. An engine operating method, comprising:
   during a first condition:
     operating an engine at a condition where a desired engine air amount is less than an amount of air flowing into an engine intake manifold via a substantially closed intake throttle and a valve; and
     closing the valve to limit engine air flow from a vacuum reservoir to the engine intake manifold when a pressure in the engine intake manifold is less than a pressure in the vacuum reservoir; and
   during a second condition:
     operating the engine at a condition where the desired engine air amount is less than the amount of air flowing into the engine intake manifold via the substantially closed intake throttle and the valve; and
     opening the valve to increase engine air flow from the vacuum reservoir to the engine intake manifold when the pressure in the engine intake manifold is less than the pressure in the vacuum reservoir.

8. The engine operating method of claim 7, further comprising operating the engine less efficiently during the second condition.

9. The engine operating method of claim 8, where the engine is operated less efficiently by increasing an amount of engine spark retard.

10. The engine operating method of claim 7, where the second condition is after an engine start and before a first depression of an accelerator pedal.

11. The engine operating method of claim 7, where the first condition is after a first depression of an accelerator pedal.

12. The engine operating method of claim 11, where the vacuum reservoir is a brake booster or a turbocharger waste gate vacuum reservoir.

13. An engine vacuum system, comprising:
an engine with an intake manifold;
a vacuum pump;
a vacuum reservoir, the vacuum reservoir in communication with the intake manifold via a first conduit, and the vacuum reservoir in communication with the vacuum pump via a second conduit;
a first valve located along the first conduit; and
a controller the controller including instructions for opening the first valve when a pressure in the intake manifold is less than a pressure in the vacuum reservoir, the controller including instructions to close the first valve when pressure in the intake manifold is less than pressure in the vacuum reservoir and when additional vacuum in the vacuum reservoir is not desired.

14. The engine vacuum system of claim 13, where the controller includes further instructions for determining additional vacuum in the vacuum reservoir is not desired when an intake throttle opening is less than a threshold amount and engine speed is higher than a threshold amount.

15. The engine vacuum system of claim 13, further comprising a check valve located along the first conduit.

16. The engine vacuum system of claim 13, where the controller includes further instructions for operating the engine at a low load condition where an opening amount of an intake throttle is less than a threshold amount, and closing the first valve to limit engine air flow between the vacuum reservoir and the intake manifold when the pressure in the intake manifold is less than the pressure in the vacuum reservoir.

17. The engine vacuum system of claim 13, where the vacuum reservoir is a brake booster or a turbocharger waste gate vacuum reservoir.

18. The engine vacuum system of claim 13, further comprising a pressure sensor located to sense the pressure of the vacuum reservoir.

19. The engine vacuum system of claim 13, where the controller includes further instructions for closing the first valve when brake booster pressure rises in response to depressing a brake pedal.

* * * * *